(12) United States Patent
Simonetti et al.

(10) Patent No.: US 6,634,192 B2
(45) Date of Patent: Oct. 21, 2003

(54) SYSTEM AND METHOD FOR FLUSHING A MEMBRANE WEB USING A VACUUM ROLLER

(75) Inventors: John A. Simonetti, Thousand Oaks, CA (US); David H. Hopkins, Escondido, CA (US)

(73) Assignee: PTI Advanced Filtration, Inc., Oxnard, CA (US)

(*) Notice: Subject to any disclaimer, the term of this patent is extended or adjusted under 35 U.S.C. 154(b) by 164 days.

(21) Appl. No.: 09/781,602

(22) Filed: Feb. 12, 2001

(65) Prior Publication Data

US 2002/0108637 A1 Aug. 15, 2002

(51) Int. Cl.[7] .................................................. D06B 5/12
(52) U.S. Cl. .............................. 68/19.1; 68/20; 68/202
(58) Field of Search .......................... 68/5 C, 5 D, 19.1, 68/20, 19, 202, 158

(56) References Cited

U.S. PATENT DOCUMENTS

| | | | | |
|---|---|---|---|---|
| 3,019,630 A | * | 2/1962 | Fleissner et al. | |
| 3,098,371 A | * | 7/1963 | Fleissner | |
| 3,467,975 A | * | 9/1969 | Fleissner | |
| 3,469,932 A | * | 9/1969 | Fleissner | |
| 3,606,774 A | * | 9/1971 | Fleissner | |
| 3,608,340 A | * | 9/1971 | Fleissner | |
| 3,681,950 A | * | 8/1972 | Fleissner | |
| 3,723,161 A | * | 3/1973 | Fleissner | |
| 3,742,734 A | * | 7/1973 | Fleissner | |
| 3,774,419 A | * | 11/1973 | Appenzeller | |
| 3,778,227 A | * | 12/1973 | Fleissner | |
| 3,828,589 A | * | 8/1974 | Collinge | |
| 3,877,124 A | * | 4/1975 | Jones | |
| 4,277,010 A | | 7/1981 | Landskroener et al. | |
| 4,728,527 A | * | 3/1988 | Herbert | |
| 5,199,125 A | * | 4/1993 | Otto | |
| 5,203,043 A | * | 4/1993 | Riedel | |
| 6,103,013 A | | 8/2000 | Stevens, III et al. | |
| 6,110,282 A | | 8/2000 | Tateyama et al. | |
| 6,257,028 B1 | * | 7/2001 | Russkamp | |
| 6,261,366 B1 | * | 7/2001 | Dubs et al. | |

FOREIGN PATENT DOCUMENTS

JP   55-119407   *   9/1980

* cited by examiner

Primary Examiner—Frankie L. Stinson
(74) Attorney, Agent, or Firm—Pillsbury Winthrop LLP

(57) ABSTRACT

The present invention is directed to a system and method for removing a first chemical from a web of filtration membrane material using a vacuum roller or other vacuum pressure application device. Embodiments of the method involve applying vacuum pressure to a surface of the membrane web, immersing said membrane web in a flushing chemical and removing the membrane web from the flushing chemical. Embodiments of the system may include one or more vacuum rollers, positioning rollers and a flushing chemical in which a portion of the membrane web may be immersed.

12 Claims, 2 Drawing Sheets

SYSTEM AND METHOD FOR FLUSHING A MEMBRANE WEB USING A VACUUM ROLLER

FIELD OF INVENTION

The present invention is directed to a system and method for manufacturing filtration media.

BACKGROUND

In the manufacturing process for filtration membrane materials, it is sometimes necessary to flush a continuous web of membrane material wetted with a first solvent in a bath containing a second solvent. This may be done to remove residues of other solvents left over from previous steps in the manufacturing operation. It may also be done to impregnate the web with other chemicals to impart different mechanical or physical properties, such as hydrophilicity, hydrophobicity, surface charge, ion exchange capabilities, strength and appearance, to the membrane material.

Two methods have been predominantly used to flush continuous webs of membrane material. In the conventional "mass transfer" technique, the first solvent-wetted web is simply soaked in a bath containing the second solvent. The period of time required for soaking is dependent upon the diffusion properties of the solvents and the effective area of the membrane-bath interface. The process is relatively slow since no driving force other than diffusion is used to move the first solvent out of the membrane material and replace the first solvent with the second solvent. For thin membrane materials, the diffusion-induced driving force for the mass transfer process can be approximated according to Fick's First Law as:

$$J_{net} = -D\Delta C/\Delta x \qquad (1)$$

where: $J_{net}$ is the net diffusional flux, $\Delta C$ is the difference in concentration between the two regions separated by a distance of $\Delta x$, and D is the "diffusion coefficient", a proportionality constant with dimensions of $cm^2/sec$.

A second process commonly used for web flushing involves the use of a "water" bearing, which is a hollow tube with openings in its exterior through which water or some other flushing chemical may be pumped. In a flushing process of this type, the membrane material web is floatably supported by water flowing from the interior of the water bearing tube through the exterior openings. Because there is no contact between the membrane material and the water bearing, this technique is often used for applications in which it is important that the introduction of surface defects in the membrane web be minimized. Flushing of the first solvent from the web is improved through the use of water bearings, since support of the membrane web on a layer of water produces a differential pressure gradient across the membrane web. The pressure differential can be approximated as:

$$P = T/R \qquad (2)$$

where:

P=the trans-membrane differential pressure (psi)
T=the tension on the web (pounds/linear inch)
R=the radius of the pipe (inches)

If it is assumed that the portion of the web floatably supported by a water bearing is supported along roughly one-half of the circumference of a cylindrical roller bearing, the amount of time for which any portion of the web is subjected to water flow at this differential pressure can be calculated as:

$$t_{flush} = \Pi R/v_{web} \qquad (3)$$

where:

$t_{flush}$=the time of contact between supporting water and a portion of the web $v_{web}$=the speed at which the web is moving (inches/second)

Therefore, the volume of water flushed through the web can be calculated as

Volume flushed (per unit area of membrane)=
$$\Delta V_{water}/\Delta t * t_{flush} * P \qquad (4)$$

where:

$\Delta V_{water}/\Delta t$=the flow rate of water through the membrane web ($in^3/in^2*psi*sec$)

As shown by the above equations, for a system involving water bearings, the volume of water flushed through the web will depend on the tension at which the web is being held, since the pressure differential across the web is directly proportional to the web tension. In many flushing applications, subjecting membrane webs to high tension may cause damage to the membrane web or even contact with the surface of the water bearings.

DETAILED DESCRIPTION

Embodiments of the present invention relate to a system for flushing a first solvent out of a continuous web of membrane material using a vacuum roller(s). Such a system has improved flushing capabilities over currently used systems because the vacuum pressure applied to the web by the vacuum roller increases the pressure differential across the membrane web, thereby increasing the driving force for removal of the first solvent and replacement with the second solvent.

Figure 1:
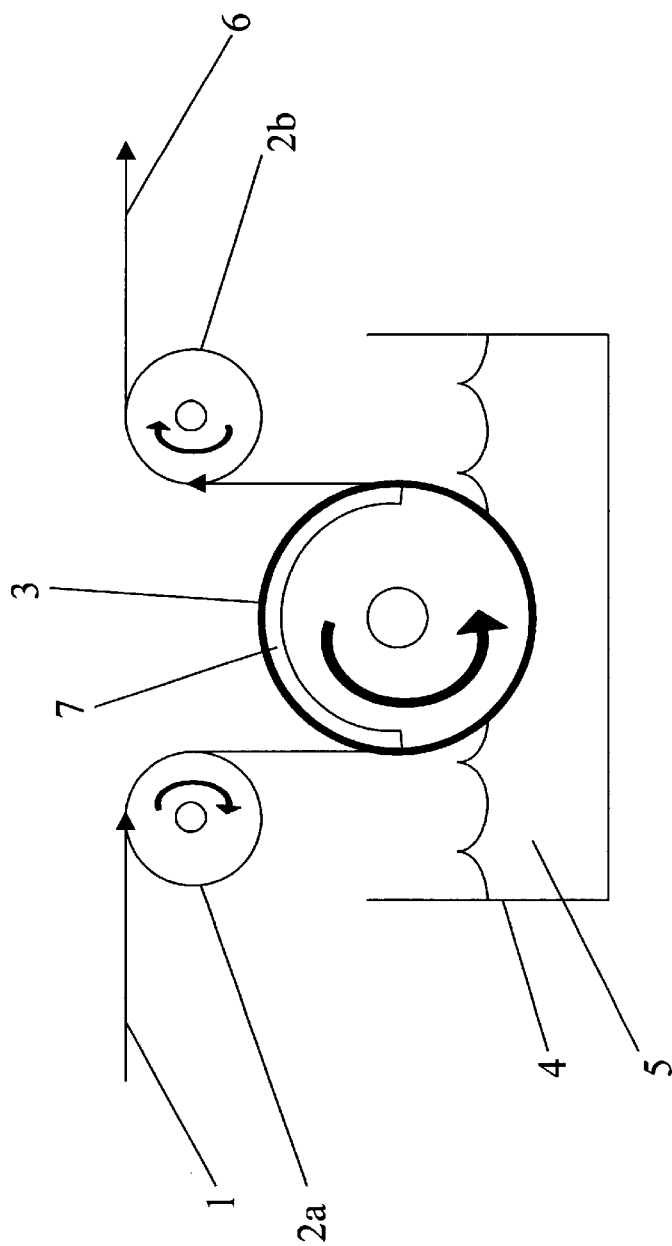
FIG. 1 depicts an portion of a web membrane flushing system according to an embodiment of the present invention.

FIG. 1 illustrates a membrane web flushing system according to an embodiment of the present invention. The unflushed membrane web 1 may be a continuous web of membrane material. The unflushed membrane web 1 may be soaked with a first chemical, such as a solvent. The unflushed membrane web 1 may be fed around a first positioning roller 2a to the vacuum roller 3. The arrows in FIG. 1 indicate the direction of feed of the membrane web 1 and the direction of rotation of the vacuum roller 3, the first positioning roller 2a and a second positioning roller 2b. The unflushed membrane web 1 may be held in contact with the vacuum roller 3 by vacuum pressure. Where the unflushed membrane web 1 contains very small pores, fluid retained in the membrane pores due to capillary forces may minimize or prevent air flow through the unflushed membrane web 1. This may allow vacuum pressure to build up so as to hold the unflushed membrane web 1 in contact with the vacuum roller 3 as the vacuum roller 3 turns. A shield 7 may be mounted inside the vacuum roller.

The vacuum roller may be partially submerged in a flushing tank 4 containing a flushing chemical 5, which may also be a solvent, e.g., water. As the vacuum roller 3 rotates, the unflushed membrane web 1 is drawn into the flushing solvent. The vacuum roller 3 may be driven to facilitate movement of the membrane web 1 over the roller assembly. When the unflushed membrane web 1 is submerged in the flushing chemical 5, the flushing chemical 5 may be drawn into the pores of the membrane web 1 by the differential pressure created by the vacuum. One of the advantages of the present invention may be that the amount of flushing chemical 5 in the flushing tank 4 necessary to remove the first chemical from the membrane web 1 may be minimized. At the same time, the first chemical may be drawn into the vacuum roller 3. The first chemical drawn into the vacuum roller 3 may subsequently be drained away. The resulting flushed membrane web 6 may be separated from the vacuum roller 3 and routed around the second positioning roller 2b. The drained first chemical may be collected and recycled.

Figure 2:
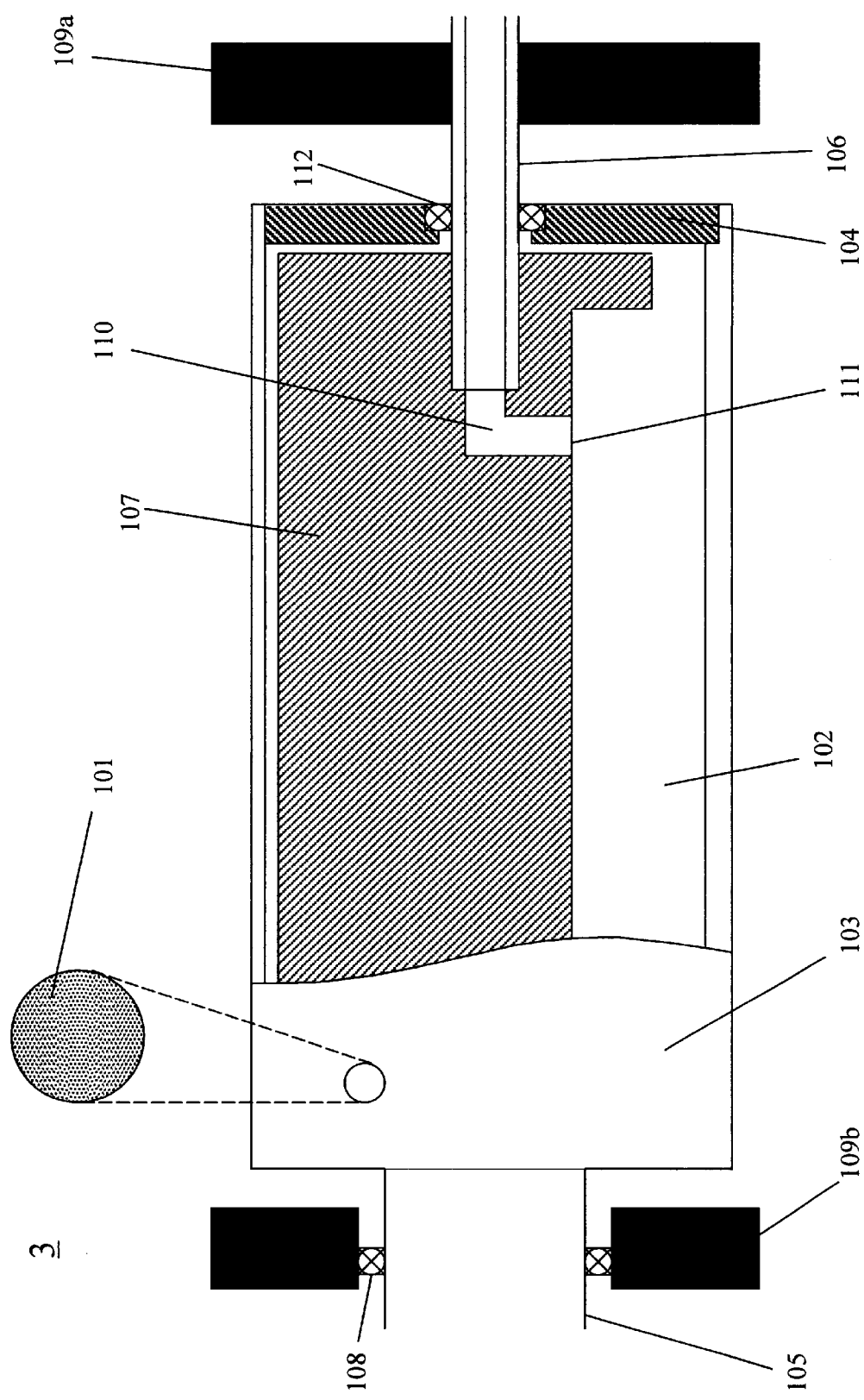
FIG. 2 depicts a vacuum roller that may be used in an embodiment of the invention.

As shown in further detail in FIG. 2, in some embodiments, the vacuum roller 3 may include a cylindrical member 103 constructed of a porous material such as polypropylene or perforated stainless steel. The cylindrical member may rotate about an axle 105, which may be supported by one or more axle bearings 108 and fixed supports 109a. The outer surface of the cylindrical member 103 may be machined to a smoothness necessary to prevent the introduction of surface defects to the membrane web via contact with the outer surface of the cylindrical member 103. The cylindrical member 103 may have multiple openings 101 extending from its interior vacuum chamber 102 to the outer surface of the cylindrical member 103. The size of the openings 101 may affect the amount of vacuum pressure that can be produced by the vacuum roller. The openings 101 may be located uniformly throughout the cylindrical member 103 and some of these openings 101 may be blocked by a shield 107 so that only the openings 101 that are not blocked by the shield 107 transmit vacuum pressure from the interior vacuum chamber 102 to the outer surface of the cylindrical element 103. The amount of vacuum pressure that can be produced by the vacuum roller may also be affected by the separation between the shield 107 and the cylindrical element 103. In order to achieve greater vacuum pressures, a seal may be placed around the shield 107 to reduce the amount of separation between the shield 107 and the cylindrical member 103.

Alternatively, only a portion of the cylindrical element 103 may have the openings 101. The openings 101 need not be circular. In some embodiments, the openings in the cylindrical member 103 may take the shape of lateral channels. The size and pattern of the openings 101 may be selected to ensure that substantially all portions of the unflushed membrane web 1 are subjected to vacuum pressure. Alternatively, the size and pattern of openings 101 may be selected so that vacuum pressure is only applied to selected portions of the membrane web 1

The amount of vacuum pressure applied to the membrane web may be determined by the density of the unflushed membrane web 1, the feed rate of the membrane web 1, the size of openings 101 in the cylindrical element 103 of the vacuum roller 3, the strength of the vacuum source (such as a vacuum pump), the fluid properties of the first chemical and flushing chemical 5, and other factors. The amount of vacuum pressure may be controlled to increase the mass transfer rate of the first chemical being removed from the unflushed membrane web 1.

Each of the lateral ends of the vacuum roller may be sealed with an end cap 104, which may act as a plug to seal the interior vacuum chamber 102. The suction source of a vacuum pump or other pump may be attached to a vacuum pressure inlet 106 so as to create a trans-web pressure differential across the pores of the membrane web. In one embodiment, the one end of the vacuum pressure inlet 106 may connect to a vacuum pressure channel 110 that terminates at a channel opening 111. The vacuum pressure channel 110 may have one or more channel openings 111 to transmit vacuum pressure to the interior vacuum chamber 102. A inlet bearing 112 may separate the end cap 104 from the vacuum pressure inlet 106. Alternatively, a rotary coupling may be used.

The effective contact area for mass transfer between the unflushed membrane web 1 and the cylindrical element 103 of the vacuum roller 3 may be determined in part by the location of the first and second positioning rollers 2a and 2b, the diameter of the vacuum roller 3, the size of the shield 107 or percentage of openings 101 transmitting vacuum pressure at any instant, and the depth of submersion of the vacuum roller 3 and unflushed membrane web 1 in the flushing chemical 5, among other factors. The mass transfer rate is affected by the effective contact area, the vacuum pressure applied to the unflushed membrane web 1 through the openings 101 in the cylindrical element 103 of the vacuum roller 3, the rate of rotation of the vacuum roller 3 and other factors related to the amount of time that any portion of the unflushed membrane web 1 is immersed in the flushing chemical.

One or more of these factors may be changed in order to increase or decrease the rate of mass transfer. For example, in embodiments of the system, the cylindrical member 103 and vacuum pressure inlet 106 of the vacuum roller 3 may be supported by mounts 109a and 109b. The position of the cylindrical member 103 and the vacuum pressure inlet 106 of the vacuum roller 3 may be raised or lowered relative to the mounts 109a and 109b so that more or less of the unflushed membrane web 1 is submerged in the flushing chemical 5. Alternatively, similar results may be accomplished by changing the configuration of the shield 7 so as to expose a greater or fewer number of openings 101 in the cylindrical member 103 of the vacuum roller 3, thereby applying vacuum pressure to a portion of the unflushed membrane web 1 for a longer or shorter period of time. In other embodiments of the invention, the rate of mass transfer may be controlled by controlling the effective contact area through other means, such as by routing the membrane web around a series of roller assemblies, some or all of which are partially submerged in the flushing chemical 5.

One or more of the first positional roller 2a, the second positional roller 2b, and the vacuum roller 3 may be driven and the remaining rollers may be undriven. By controlling the rotational velocity of the driven roller(s), the feed rate and tension of the membrane web may be controlled. In embodiments of the invention, both the first and second positional rollers 2a and 2b may be driven and their speeds may be independently controlled. In such a system, if the tension on the flushed membrane web exceeds desired amounts, the speed of the second positional roller 2b may be reduced in relation to the speed of the first positional roller 2a. The flushing performance of the vacuum roller 3 flushing system of the present invention is largely independent of membrane web tension, allowing the system to be used with delicate membranes that can only be placed under low tension.

In embodiments of the invention in which the first chemical is drained away after it has been drawn into the vacuum roller 3, the vacuum pressure inlet 106 may be positioned near the bottom of the cylindrical element 103 of the vacuum roller 3 and in some case, may be submerged below the level of the flushing chemical 5. The vacuum pressure inlet 106 material is preferably chosen to be chemically compatible with the flushing chemical 5 and/or first chemical.

While the embodiments particularly described above have generally focused on the use of a vacuum roller 3, in other embodiments of the invention, vacuum pressure may be applied to the membrane web using a vacuum belt or similar device. In an embodiment using a vacuum belt, the unflushed membrane web 1 may be held against the vacuum belt by vacuum pressure applied through openings in the vacuum belt. The unflushed membrane web 1 may travel in the same direction as the portion of the vacuum belt against which the unflushed membrane web 1 is being held. The vacuum belt may be partially submerged in the flushing chemical 5. Such an embodiment may also be used with membrane web that is not continuous, e.g. in the form of pre-cut sheets.

While the description above refers to particular embodiments of the present invention, it should be readily apparent to people of ordinary skill in the art that a number of modifications may be made without departing from the spirit thereof. The accompanying claims are intended to cover such modifications as would fall within the true spirit and scope of the invention. The presently disclosed embodiments are, therefore, to be considered in all respects as illustrative and not restrictive, the scope of the invention being indicated by the appended claims rather than the foregoing description. All changes that come within the meaning of and range of equivalency of the claims are intended to be embraced therein.

What is claimed is:

1. A system for flushing a first chemical from a membrane web, said membrane web having a first surface and a second surface, said system comprising:
    a vacuum roller having a vacuum pressure inlet, an interior vacuum chamber and a cylindrical element with an opening, said opening having a first end at an outer surface of said cylindrical element and a second end at an inner surface of said cylindrical element,
    a vacuum pressure source connected to said vacuum pressure inlet to apply a vacuum pressure, wherein said vacuum pressure applied to said membrane web is controlled based upon the desired rate of removal of said first chemical from said membrane web; and
    a flushing chemical, wherein
        at least a portion of said membrane web is held in contact with said vacuum roller, and said portion is at least partially immersed in said flushing chemical.

2. The system of claim 1, wherein said vacuum roller includes an axle about which said cylindrical element rotates.

3. The system of claim 1, further including a first positioning roller.

4. The system of claim 3, wherein said first positioning roller is in contact with an unflushed portion of said membrane web.

5. The system of claim 3, further including a second positioning roller.

6. The system of claim 5, wherein said second positioning roller is in contact with a flushed portion of said membrane web.

7. The system of claim 5, wherein at least one of said first positioning roller and said second positioning roller is driven.

8. The system of claim 3, wherein said first positioning roller is driven.

9. The system of claim 1, wherein said cylindrical element rotates through a rotational cycle, and said vacuum roller further includes a shield, said shield and said inner surface of said cylindrical member being configured so to substantially enclose said interior vacuum chamber.

10. The system of claim 1, wherein said cylindrical element has a plurality of openings, each opening having a first end at said outer surface and a second end at said inner surface.

11. The system of claim 1, wherein said vacuum roller may be moved relative to a surface of said flushing chemical so as to change the size of the portion of said membrane web immersed in said flushing chemical.

12. A system for flushing a first chemical from a membrane web, said membrane web having a first surface and a second surface, said system comprising:
    a vacuum roller having a vacuum pressure inlet, an interior vacuum chamber, a cylindrical element having a plurality of openings, a shield, and an axle, each opening of said cylindrical element having a first end at an outer surface of said cylindrical element and a second end at an inner surface of said cylindrical element;
    a vacuum pressure source connected to said vacuum pressure inlet;
    a first positioning roller in contact with an unflushed portion of said membrane web;
    a second positioning roller in contact with a flushed portion of said membrane web; and
    a flushing chemical; wherein
        at least a portion of said membrane web is held in contact with said vacuum roller,
        said portion is at least partially immersed in said flushing chemical,
        said vacuum roller rotates about said axle,
        said shield separates at least one of said plurality of openings from said interior vacuum chamber,
        said vacuum pressure applied to said membrane web is controlled based upon the desired rate of removal of said first chemical from said membrane web, and
        at least one of said first positioning roller, said second positioning roller and said vacuum roller is driven.

* * * * *